Patented Dec. 30, 1924.

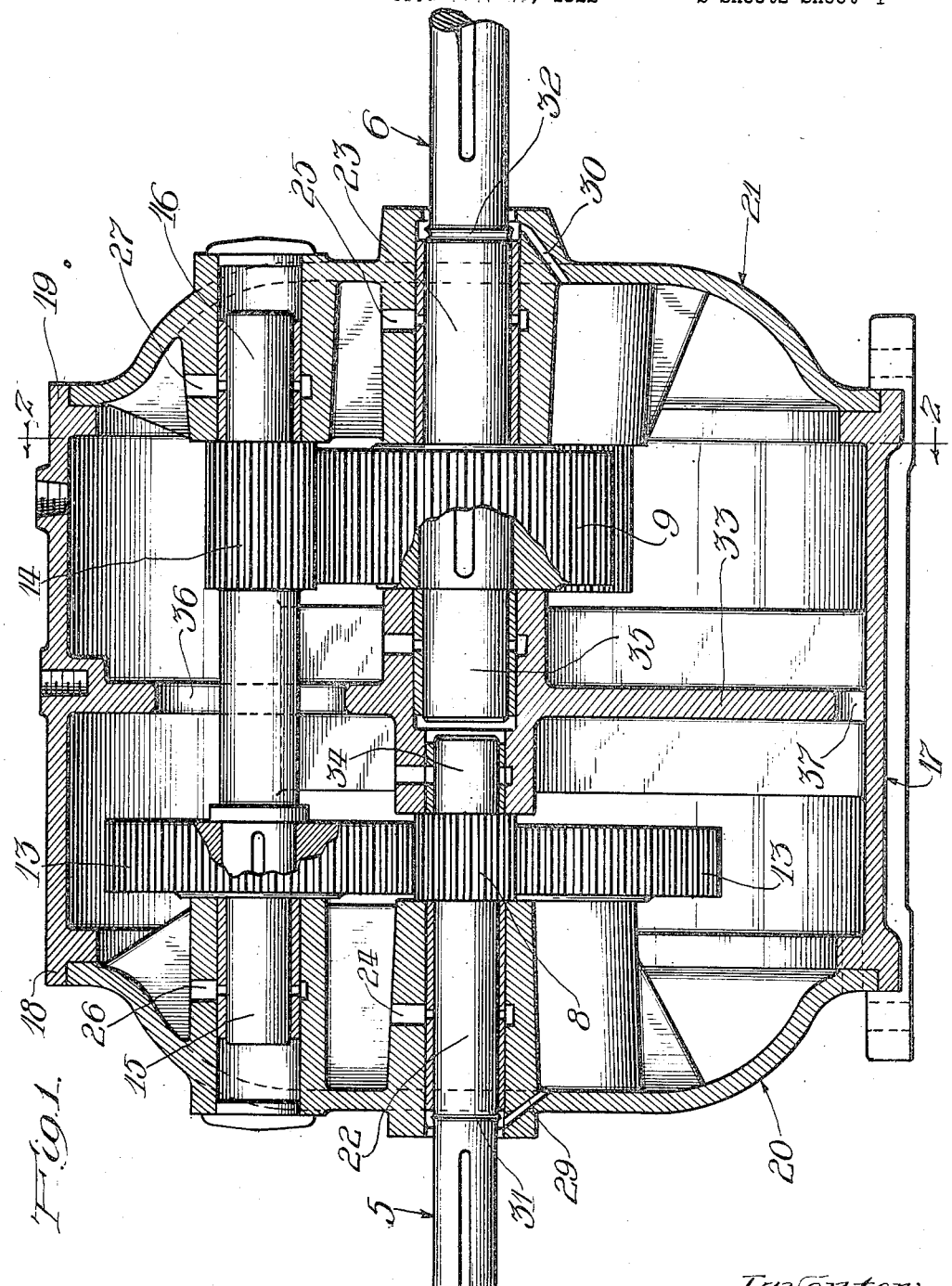

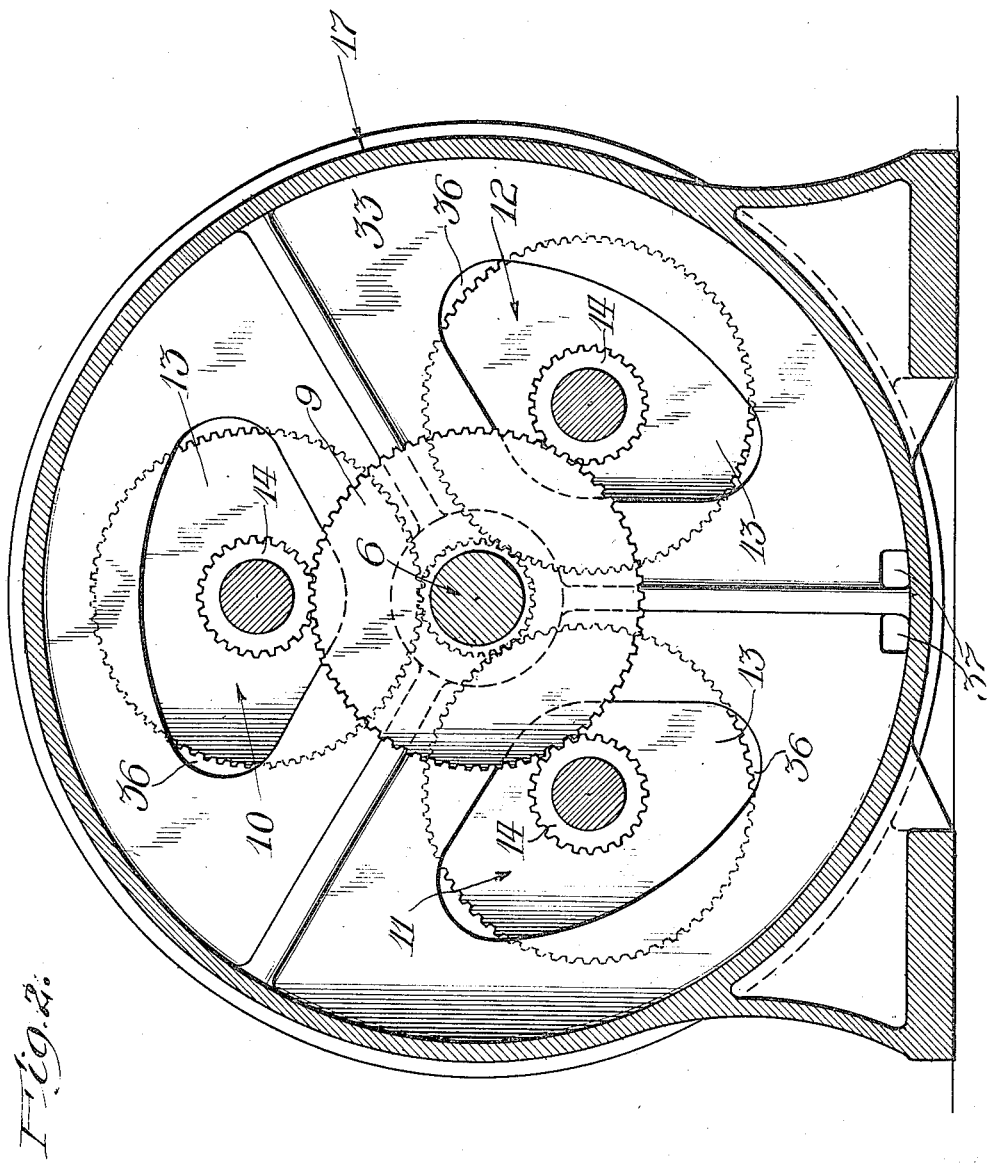

1,521,104

UNITED STATES PATENT OFFICE.

WARREN G. JONES, OF CHICAGO, ILLINOIS, ASSIGNOR TO W. A. JONES FOUNDRY & MACHINE COMPANY, OF CHICAGO, ILLINOIS, A CORPORATION OF ILLINOIS.

SPEED CHANGER AND THE LIKE.

Application filed October 23, 1922. Serial No. 596,412.

*To all whom it may concern:*

Be it known that I, WARREN G. JONES, a citizen of the United States, residing at Chicago, in the county of Cook and State of Illinois, have invented certain new and useful Improvements in Speed Changers and the like, of which the following is a specification.

This invention has to be with certain improvements in speed changers and the like. The invention has reference particularly to certain improvements in gear change speed devices.

Machines embodying the features of the present invention may be used for either increasing or decreasing the speed with corresponding inverse change of torque. For purposes of convenience in description, in the present case, I will hereinafter refer to the high speed shaft as the driving shaft and the low speed shaft as the driven shaft; but in so doing it will be understood that this terminology is used merely as a matter of convenience in description, and not as a matter of limitation.

Bearing the foregoing in mind, one of the objects of the invention is to provide a speed change device which will operate at very high efficiency; and in this connection, a further object is to make provision for the effective and thorough lubrication of all of the running parts.

Another object of the invention is to provide an arrangement of gears and pinions which will establish a balanced drive and a balanced delivery of torque and side thrusts on the bearings, thus largely reducing the friction and wear and materially improving the overall efficiency of the machine.

Another object of the invention is to make provision for retaining the two shafts at all times firmly in alignment with each other. In this connection, a further object is, in one form of the machine, to make provision for an inboard bearing for the inner ends of both of the shafts, so that their alignment will be more perfectly maintained without the need of bringing these shafts directly together.

Another feature of the invention relates to the construction of the casing; and in this connection, a further object is to make provision for journalling the various shafts and gears in the casing heads, so that the machine may be very easily and quickly assembled, and so that the alignment of the various parts can be readily established.

Other objects and uses of the invention will appear from a detailed description of the same, which consists in the features of construction and combinations of parts hereinafter described and claimed.

Referring to the drawings:

Fig. 1 shows a longitudinal section through one form of machine embodying the features of the present invention, in which there is provided an inboard bearing for the inner ends of both of the shafts; and Fig. 2 shows a cross section taken on the line 2—2 of Fig. 1, looking in the direction of the arrows.

Referring to the drawings, the machine includes the high speed shaft 22 and the low speed shaft 23. These shafts are lined up with each other. Usually the high speed shaft handles a proportionally smaller torque than the low speed shaft, and is made smaller in diameter as clearly shown in the figures.

On the inner end portion of the high speed shaft is a pinion 8 and on the inner end portion of the low speed shaft is a gear 9. Surrounding the pinion and gear there is located a series of back gear members 10, 11 and 12, each of which includes a gear 13 meshing with the pinion 8 and a pinion 14 meshing with the gear 9. Each of the back gear members 10, 11 and 12 includes a shaft having the end bearings 15, and 16.

In manufacturing the parts I prefer to form the pinion 8 integral with the high speed shaft 5, hardening said pinion; but I prefer to form the gear 9 separately from the low speed shaft 6, and key the gear on to the shaft. This construction is preferable for the reason that the size of the gear 9 is ordinarily such that it cannot be conveniently hardened except as a separate unit.

Furthermore, I prefer to form each of the back gear members 10, 11 and 12 with its pinion 14 integral with its shaft, the pinion being hardened; and I also prefer to form the gears 13 separately from the shafts, keying the gears onto the shafts, since this construction also makes it possible to harden these gears separately.

The casing includes a central annular drum member 17, with its end portions provided with the flanges 18 and 19 as clearly shown in Fig. 1. The heads 20 and 21 are adapted to set into said flanges 18 and 19 so as to firmly center the drum and the heads. The high speed shaft 5 is journaled in the head 20 by the bearing 22, and the low speed shaft 6 is journaled in the head 21 by means of a bearing 23. The bearings 22 and 23 may be made amply large, as shown in Fig. 1, to maintain the shafts in accurate alignment, and this is especially feasible in view of the interbearing 7 between the inner ends of the two shafts.

The housing may be filled with oil up to a level which will insure thorough lubrication of all of the moving parts. In this connection, the bearings 22 and 23 are provided with oil openings 24 and 25 respectively, which may receive oil either directly from the oil level within the casing or may receive oil thrown off from the gears in mesh. Similarly, openings 26 and 27 are provided for the bearings 15 and 16 of the various back gears. The bearings 22 and 23 may be provided with drain passages 29 and 30 respectively, for returning oil to the lower portion of the casing, and the shafts 5 and 6 are provided with the flanges 31 and 32 to throw off any surplus oil and deliver the same to the drain passages 29 and 30.

Examination of Fig. 2 shows that the three back gears are equidistantly located around the interior of the machine, so that they engage the pinion 8 and gear 9 at points 120° apart. This will insure a perfectly balanced operation, so that no side thrusts are created on the two shafts 5 and 6, and the only load which the shaft bearings have to carry is the weight of the parts.

Considering the construction shown in the drawings the drum 17 is provided with a transverse web 33 having the bearings 34 and 35 for the high and low speed shafts respectively. The back gears 13 are separated from their respective pinions 14 a suitable distance to insure proper meshing with the pinion 8 and gear 9 respectively.

The shaft portion of each of the back gears passes through an opening 36 in the web 33, said openings being sufficiently large to pass the pinions 14, so that the parts can be readily assembled.

This arrangement presents the advantage that the high and low speed shafts are both rigidly supported at their inner ends, so that the high speed shaft 6 finds rigid bearing at both sides of the pinion 8, and the low speed shaft finds rigid bearings at both sides of the gear 9.

The web 33 may be provided with an opening 37 in its lower portion to permit a ready circulation of oil, so that the lower portion of the web will not interfere with the proper oil circulation.

While I have herein shown and described only certain embodiments of the features of my present invention, still I do not limit myself to the same except as I may do so in the claims.

I claim:

1. A change speed device comprising in combination a cylindrical drum having a central transverse partition, removable heads at the ends of the drum, a high speed shaft extending through one head and journaled with an inboard bearing in said partition, a low speed shaft extending through the other head in alignment with the high speed shaft and journaled with an inboard bearing in said partition adjacent to the high speed shaft inboard bearing, there being openings in the partition at separated points around said inboard bearings, a pinion on the high speed shaft adjacent to its inboard bearing, a gear on the low speed shaft adjacent to its bearing, back gear shafts reaching through the partition openings aforesaid and journaled in the casing heads, and gears and pinions on said back gear shafts meshing respectively with the pinion and gear on the high speed and low speed shafts, the partition opening being of sufficient size to pass the back gear shafts and their pinions, substantially as described.

2. A change speed device comprising in combination a cylindrical drum having a central transverse partition, heads at the ends of the drum, a high speed shaft extending through one head and journaled with an inboard bearing in said partition, a low speed shaft extending through the other head in alignment with the high speed shaft and journaled with an inboard bearing in said partition adjacent to the high speed shaft inboard bearing, there being openings in the partition at separated points around said inboard bearings, a pinion on the high speed shaft adjacent to its inboard bearing, a gear on the low speed shaft adjacent to its bearing, back gear shafts reaching through the partition openings aforesaid and journaled in the casing heads, and gears and pinions on said back gear shafts meshing respectively with the pinion and gear of the high speed and low speed shafts, the partition openings being of sufficient size to pass the back gear shafts, substantially as described.

WARREN G. JONES.